Nov. 5, 1968          J. L. BAIRD ET AL          3,409,515
METHOD OF STRIPPING VOLATILE CONSTITUENTS FROM A MIXTURE
Filed March 30, 1966
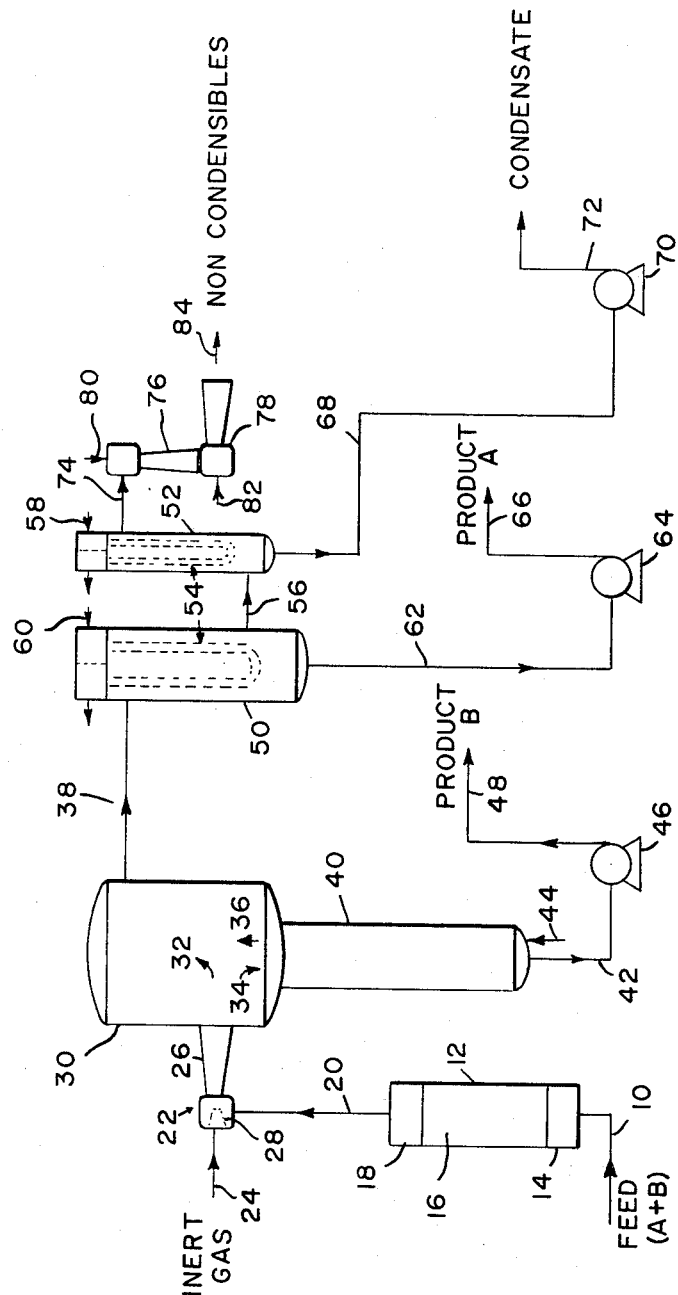
INVENTORS
JAMES L. BAIRD
EDMUND A.J. MROZ
BY Richard P. Crowley
ATTORNEY

United States Patent Office 3,409,515
Patented Nov. 5, 1968

3,409,515
METHOD OF STRIPPING VOLATILE CONSTITUENTS FROM A MIXTURE
James L. Baird, Winchester, and Edmund A. J. Mroz, Stoneham, Mass., assignors to Artisan Industries, Inc., Waltham, Mass., a corporation of the Commonwealth of Massachusetts
Filed Mar. 30, 1966, Ser. No. 538,733
8 Claims. (Cl. 203—49)

ABSTRACT OF THE DISCLOSURE

Feed material is passed through a tubular heat exchanger and heated to but not exceeding its boiling point. An inert gas at about the same or higher temperature is injected into the heated feed at its exit and prior to admission into a flash chamber where higher volatility vapors are released and subsequently elsewhere condensed. The residue is passed downwardly into an indirectly steam heated disc-tube film evaporator.

---

Our invention relates to a system for the improved stripping of volatile constituents from a liquid mixture comprising high and low volatility materials. In particular our invention relates to a method of reducing the high volatility constituents in an organic liquid mixture so as to increase the efficiency or capacity of a subsequent heat-treating process to deplete further the constituents of higher volatility from the mixture being stripped.

The removal of relatively low volatility constituents from a relatively higher volatility liquid is typically accomplished in an evaporation system operated under vacuum. The removal or stripping of the low volatility constituents may be carried out in an evaporator-stripper device wherein continuous evaporation and continuous thin film stripping is accomplished in a single operation or unit. For example, an evaporator-stripper may consist of a cascade type tube and disc column in which the tubes-and-discs are alternately arranged to provide frequent re-forming of the thin liquid film passing therethrough from the top to the bottom. Such an operation ensures a fresh liquid surface from which the more volatile constituent may be evaporated into an inert vapor stream, such as steam, which is passed upwardly through the unit.

A relatively high content of the higher volatility constituents in the liquid mixture entering the top of such an evaporator-stripper causes a relatively high drop in temperature of the liquid as it cascades down through the stripping device. In such a case the latent heat of evaporation for the higher volatility constituent is provided by a drop in the temperature or sensible heat of the liquid. The lower temperature resulting at the lower end or bottom of the evaporator-stripper results in a higher content than desired of the higher volatility constituents in the stripped liquid. For example, such an operation determines a relatively higher volatility remaining in the stripped liquid mixture which is removed from the bottom of the evaporator-stripper. To obtain a lower content of the higher volatility constituent in the bottoms liquid, a greater quantity of inert stripping medium, for example, steam, air, nitrogen, or the like, must be introduced and passed through the evaporator. Such gaseous stripping medium contacts the liquid repeatedly and counter-currently as the liquid proceeds downwardly over each tube-and-disc element.

Of course, additional tube-and-disc elements might be added to improve the stripping operation; however, each added element contributes incrementally to the pressure drop in the evaporator. The addition of too many elements may create a situation so that the pressure drop of the vapors flowing up the evaporator cancel the effectiveness of the additional tube-and-disc elements. In high vacuum stripping operations the efficiency and performance of the evaporator-stripper is adversely affected and its low pressure drop is increased. Jacketing of the tube-and-disc stripper elements may also be required when too great a drop in temperature could occur in the liquid mixture cascading through the stripper device. A typical evaporator-stripper device wherein problems of this nature might occur is described in U.S. Patent No. 3,198,241.

It is an object of our invention to provide an improved system for the removal of higher volatility constituents from a liquid mixture prior to subsequent heat processing of the mixture to reduce further the higher volatility constituents in the mixture.

Another object of our invention is to provide a system for and a method of increasing the efficiency or performance of evaporator-stripper devices by prior processing the liquid feed mixtures introduced into such devices so as to remove at least part of the higher volatility constituents of the mixture.

A further object of our invention is to provide a means for removing or stripping volatile components from a liquid mixture by mixing the liquid mixture containing the higher volatility components with an inert, gaseous stripping medium, flashing off at least a part of the higher volatility components, and removing the stripping medium with the higher volatility components in the vapor phase.

Other objects and advantages of our invention will be apparent to those persons skilled in the art from the following more detailed description of our invention taken with the accompanying drawing wherein there is shown a schematic process flow diagram of one specific and preferred embodiment of our invention.

Briefly, our invention comprises intimately mixing an inert gaseous fluid medium into and with a heated liquid feed stream containing higher and lower volatility components. The effluent mixture is then discharged into a zone of lower pressure wherein the inert gaseous fluid medium and at least part of the components of higher volatility are removed in vapor form. The resulting liquid which is less concentrated in the components of higher volatility than the original liquid feed stream is then subjected to further heat-treating processes to deplete further the constituents of higher volatility. For example, in one preferred embodiment of our invention an inert, gaseous stripping medium is directly introduced into and intimately mixed with a heated liquid feed stream, the gaseous stripping medium lowering the partial pressure of the components of higher volatility in the feed stream. The liquid effluent mixture is then discharged into a zone of lower pressure, such as a jet diffuser and flash chamber, wherein at least a part of the higher volatility components flash into the vapor phase. The inert, gaseous stripping medium and the components of higher volatility in the vapor phase are then removed from the zone of lower pressure, while the liquid containing a reduced amount of the higher volatility components is then subjected to a high vacuum or evaporation or stripping operation to further remove components of higher volatility.

In operation the introduction in mixing of an inert, gaseous stripping medium with a preheated liquid feed stream serves to lower the partial pressure of the various components of the feed stream. The effluent mixture comprising the feed stream and the inert gaseous fluid is introduced into a zone of lower pressure at or near the bubble point temperature of the liquid mixture. The temperature of introduction into a flash chamber would depend upon the relative concentrations of the various components of the feed mixture. A predetermined degree of flashing of the components of higher volatility is obtained by the appropriate introduction of the inert gaseous medium into the feed which is maintained at particular values of pressure and temperature. The flashed higher volatility components, together with the gaseous, inert medium, are then removed overhead from the flash chamber either for subsequent treatment and recovery of the higher volatility components or where the higher volatility component is an impurity for the discharge of such mixture. The quantity of the higher volatility component removed decreases the concentration of that component in the liquid entering the subsequent evaporation or other heat-treating process. The amount and temperature of the inert fluid mixed with the feed stream may vary depending on the degree of flashing desired. Amounts of from 0.5 to 50 weight percent of the inert fluid may often be used for mixing with the heated liquid or liquid-vapor feed stream. In certain cases the liquid product from which the higher volatility components have been removed by flashing may be reheated and the process of mixing with an inert gas repeated in a two or multi-stage process prior to or in lieu of subjecting the liquid to an evaporation process.

For example, where the subsequent heat-treating process is a high vacuum evaporator-stripper operation, the lower concentration of the higher volatility components in the liquid portion of the mixture removed from the flash chamber and introduced into the evaporator stripper considerably reduces the stripping duty required for a liquid bottoms product of specified concentration of the higher volatility component. The lesser quantity of the higher volatility component in the liquid mixture feed to the tube-and-disc, thin film or other subsequent evaporator operation results in a lesser temperature drop, since less latent heat is required from the liquid to vaporize the lower quantity of the higher volatility component. Accordingly, a higher temperature will exist at the end of the evaporation operation, which higher temperature determines a relatively greater volatility of the higher volatility constituents and permits the recovery of a liquid bottoms stream having a lesser concentration of the higher volatility component. Also, lesser quantities of inert gaseous stripping medium, such as steam, are required in a given evaporator device to achieve a liquid bottoms product of a given low content of higher volatility components, when such a feed mixture having a lower content of the higher volatility components is fed to the device than when a feed mixture contains a greater amount of the higher volatility components and the stripping device is operated at identical temperature, pressures and feed rate. When the feed rate, temperature and pressure of an evaporator device is fixed and comparable amounts of a liquid feed stream are separately processed, one of which contains a greater initial concentration of the higher volatility components, a liquid bottoms product containing a lower final concentration of higher volatility component will be achieved when the liquid feed mixture containing a lesser initial concentration the higher volatility component is handled. Further, to achieve a liquid bottoms product of identical residual concentration of higher volatility components under the same conditions, a fewer number of contact stages, i.e., disc-and-tube units or evaporative surface, is required when processing a feed of lesser higher volatility component content than would be required when processing a feed of greater higher volatility component content. In addition, jacketing of the evaporation unit or heat stripper stripping device may not be necessary under such conditions.

Our system and method for the purposes of illustration only will be described in the processing of an ester plasticizer-alcohol mixture to remove the alcohol to a low parts per million range after the esterification reaction. The alcohol component of the mixture is the higher volatility component and is not an impurity, but is to be removed and recovered for re-use. The lower volatility component recovered as a bottoms liquid with say less than 10 parts per million of the alcohol component therein is the higher molecular weight esterified alcohol. In the schematic illustration the higher volatility component, the alcohol having a lower molecular weight will be identified as component A, while the higher molecular weight esterified alcohol will be identified as component B. In the schematic illustration shown in the drawing a liquid feed stream of components A and B is introduced through conduit 10 into a pre-heater 12 through an inlet 14, a heating chamber 16, and an outlet 18, wherein the feed mixture is heated to or about the bubble point of the feed stream, which in this case is approximately 367° F. The heated feed is introduced through conduit 20 into a mixing device comprising an eductor body 22 surrounding a nozzle 28. Steam is introduced through conduit 24 into and through nozzle 28 to become intimately mixed with the heated feed stream introduced into the eductor body 22. The jet nozzle 28 introduces saturated or superheated steam at about 100 to 200 pounds pressure and 338 to 400° F. (superheated 200 p.s.i.g. steam) into the preheated feed stream. The heated, mixed effluent stream of A and B is then discharged and passes through a diverging diffuser body 26 wherein flashing of the more volatile component A of the feed stream is accomplished Flashing may be completed in the flash chamber 30 into which the effluent stream is discharged from the diffuser 26. The steam and vaporized component A shown as stream 32 are withdrawn through conduit 38, while the less volatile liquid stream 34 comprising primarily component B and lesser quantities than the original feed of component A is introduced directly from the flash chamber 30 into the top of an evaporator-stripper 40, such as a type illustrated in U.S. Patent 3,198,241. In such a gravity fed cascade-type tube-and-disc stripper, steam is introduced into the bottom of the stripper through conduit 44 to pass upwardly and counter-current to the liquid mixture 34 from the flash chamber 30. This vapor stream 36 having a stripped portion of feed component A and the stripping steam therein is discharged into the flash chamber 30 and also withdrawn through conduit 38 from the flash chamber. A liquid bottoms mixture is withdrawn from the bottom of the evaporator-stripper 40 through conduit 42 by pump 46 and recovered from conduit 48 as liquid product B with a predetermined low amount of component A therein.

The steam and vaporized A component from the flash chamber 30 is introduced through conduit 38 into a distillate condenser 50 containing U cooling tubes 54. A cooling fluid such as water at about 85° F. is passed through the condenser tubes 54 through conduit 60. Component A is condensed and withdrawn through conduit 62 by pump 64 and conduit 66 and recovered as product A. Uncondensed vapor from condenser 50 is removed through conduit 56 and introduced into a vent condenser 52 containing U shaped cooling tubes 54, cooled to a lower temperature than in condenser 50 by the use of a refrigerant such as 50° water passed through conduit 58 and the U tubes 54. Condensate is removed from condenser 52 through conduit 68 by pump 70 and discharged through conduit 72. Non-condensables are removed from condenser 52 through conduit 74 and introduced into a pair of steam jet ejectors 76 and 78 wherein steam is introduced through conduit 80 and conduit 82 and the non-condensables discharged about atmospheric pressure at 84.

The advantages of employing the foregoing described method is more readily seen from the following Table 1 wherein a direct comparison is made between identical operations with or without the intimate mixing of steam with a preheated liquid feed stream of A and B.

TABLE I

[Case I. No Steam, Dry Feed Flash at 340° F., 20 torr (mm. mercury absolute)]

| Comp. | Feed | | | | Vapor | | | | Liquid | | | |
|---|---|---|---|---|---|---|---|---|---|---|---|---|
| | P.p.h. | Wt. percent | M/hr. | x | P.p.h. | Wt. percent | M/hr. | y | P.p.h. | Wt. percent | M/hr. | x |
| A | 1,500 | 10.20 | 9.4757 | 0.2428 | 950 | 99.5 | 6.0037 | 0.9981 | 550 | 4.0 | 3.4728 | 0.1052 |
| B | 13,200 | 89.80 | 29.5500 | 0.7572 | 5 | 0.5 | 0.0114 | 0.0019 | 13,195 | 96.0 | 29.5390 | 0.8948 |
| | 14,700 | 100.00 | 39.0257 | 1.0000 | 955 | 100.0 | 6.0151 | 1.0000 | 13,745 | 100.0 | 33.0118 | 1.0000 |

[Case II. 300 p.p.h. Steam (identical to Case I) Dry Feed Flash at 340° F., 20 torr]

| Comp. | Feed | | | | Vapor | | | | Liquid | | | |
|---|---|---|---|---|---|---|---|---|---|---|---|---|
| | P.p.h. | Wt. percent | M/hr. | x | P.p.h. | Wt. percent | M/hr. | y | P.p.h. | Wt. percent | M/hr. | x |
| $H_2O$[1] | 300 | 2.0 | 16.6519 | 0.2991 | 300 | 18.11 | 16.6488 | 0.6630 | 0 | 0 | 0.0031 | 0.0002 |
| A | 1,500 | 10.0 | 9.4757 | 0.1702 | 1,330 | 80.27 | 8.4021 | 0.3346 | 170 | 1.27 | 1.0736 | 0.0351 |
| B | 13,200 | 88.0 | 29.5500 | 0.5307 | 27 | 1.63 | 0.0603 | 0.0024 | 13,173 | 98.73 | 29.4903 | 0.9647 |
| | 15,000 | 100.0 | 55.6776 | 1.0000 | 1,657 | 100.01 | 25.1112 | 1.0000 | 13,343 | 100.00 | 30.5670 | 1.0000 |

[Case IIa. For comparison with Case I, removing $H_2O$ from above tabulation]

| Comp. | Feed | | | | Vapor | | | | Liquid | | | |
|---|---|---|---|---|---|---|---|---|---|---|---|---|
| | P.p.h. | Wt. percent | M/hr. | x | P.p.h. | Wt. percent | M/hr. | y | P.p.h. | Wt. percent | M/hr. | x |
| A | As in Case I | | | | 1,330 | 98.01 | 8.4021 | 0.9929 | 170 | 1.27 | 1.0736 | 0.0351 |
| B | As in Case I | | | | 27 | 1.99 | 0.0603 | 0.0071 | 13,173 | 98.73 | 29.4903 | 0.9649 |
| | | | | | 1,357 | 100.00 | 8.4624 | 1.0000 | 13,343 | 100.00 | 30.5639 | 1.0000 |

[1] Steam, intimately mixed with feed consisting of A and B.
Comp., Component.  P.p.h., Pounds per hour.  Wt. percent, Weight percent.  M/hr., Moles per hour.  x and y, Mol fraction.  A, Alcohol.  B, Esterified alcohol.

Table I shows that with identical flash vaporization conditions of 340° F. and 20 torr two distinctly different liquid compositions result. With no steam intimately mixed with the preheated feed stream a liquid composition with 4 percent by weight of the higher volatility component A results. With 300 pounds per hour of live steam intimately mixed with the preheated feed liquid a liquid composition containing only 1.27 weight percent of the A component is provided. In Case I the feed stream is preheated to 359° F. to accomplish the flash, while the feed in Case II is preheated to 367° F. In Case II the liquid obtained (illustrated as 34 in our drawing) is less concentrated in the higher volatility component A than in Case I. Consequently, a lesser evaporative load is then required to reduce the content of the higher volatility A component, say to 10 parts per million, in an evaporator than the corresponding evaporative load required for Case I wherein no steam is used. As a result a more compact and, therefore, less expensive apparatus is required to achieve a bottoms liquid of predetermined A content as compared to a similar unit which would require a greater evaporative load. The same principles of operation also apply to whatever the nature of the ultimate heat treating or evaporative type device which is subsequently employed to handle the liquid product stream 34 from the flash chamber.

For the purposes of illustration the mixing of the steam with the preheated feed stream was shown as being accomplished by the use of a mixing device comprising an eductor body a diffuser and a nozzle located within the eductor body. However, any means of intimately mixing and distributing the fluid into the preheated feed stream may be accomplished, such as by the use of a typical steam jet ejector which has a nozzle and converging and diverging sections or any other means wherein the fluid is intimately mixed with the preheated feed stream and then discharged to a region of lower pressure to accomplish flashing of the more volatile component.

In our preferred embodiment the fluid is a gaseous, inert stripping medium from which the higher volatility component can be readily separated by conventional separation techniques of condensation, absorption, adsorption, permeation, chemical reaction, etc. A wide variety of compressed inert gases may be employed as the inert gaseous medium such as nitrogen, helium, air, carbon monoxide, carbon dioxide, fuel and combustion gases, hydrogen, ammonia, hydrocarbons like methane, ethane, butane, pentane, halogens, fluoro-carbons like Freon, such as fluoro and fluoro-chloro substituted methane, ethane, propane, etc., and mixtures thereof.

Acidic or basic inert gas may be recovered or separated from the higher volatile components by neutralization. For example, ammonia may be neutralized in an acidic medium or by absorption in water to form aqua ammonia, while carbon dioxide may be neutralized in mono-ethanol amine solutions or in alkali solutions, or absorbed in water. Where a gaseous fuel or combustile gas is used, the gas with any residual higher volatility component may be directed to a combustion zone and burned.

In another embodiment of our invention a material, solid or liquid, which subsequently decomposes or vaporizes exothermally on mixing or upon introduction into a zone of lower pressure to lower the partial pressure of the higher volatility component may be dispersed in or mixed with a preheated liquid feed stream. For example, the feed stream may be mixed with a liquid which vaporizes exothermally upon mixing or directly thereafter.

The feed stream has been described as being preheated to about the bubble point temperature. For the purpose of this application the bubble point temperature is that temperature wherein initial gaseous formation of one of the components of the feed stream occurs in the liquid phase of the feed stream at the system pressure. In any case, the liquid feed stream should be heated to a predetermined temperature sufficient to accomplish the desired flashing of the higher volatility component upon being introduced into the zone of lower pressure.

Our process has also been described in connection with the operation of an evaporator-stripper operated under vacuum as the subsequent heat-treating device to be employed. However, a wide variety of heat-treating devices or systems may be used such as, for example, heat exchangers, evaporators, reactors, thin film strippers, distillation columns, wiped surface heat exchangers, or the like. Our systems will have particular utility wherever the stripping of volatile organic materials from relatively non-volatile organic liquid or liquid mixtures is desired. Typical processes employing our system include the deodorization of petrolatum, plasticizers, polyvinyl acetates, and monomeric and polymeric mixtures, desolventizing lubricating and other oils, fats, phenyls, phenol, polymer and petroleum mixtures, concentrating caprolactam and other liquids, recovering solvents, glycerines, benzenes, and the like, and in the processing and separation of synthetic aromatics, glycerines, esters, ketones and other organic products.

Our invention is, therefore, advantageous in increasing the capacity of existing heat-treating devices such as evaporators, strippers, distillation columns and the like, or in improving the efficiency and performance thereof. Our discovery is particularly adaptable to the separation and recovery of a relatively high volatility component from a relatively low volatility component or for the removal in an efficient and economical manner of relatively low volatility impurities in a liquid feed stream containing constituents of yet lower volatility.

What we claim is:

1. An improved method for the stripping of a higher volatility component from a liquid mixture containing a relatively high and a relatively low volatility component, which method comprises the steps of:
   (a) heating said liquid mixture to the bubble point temperature of the liquid mixture;
   (b) introducing and intimately mixing an inert gaseous fluid into and with the heated liquid mixture after said liquid mixture has been heated to its bubble point temperature to lower the partial pressure of the higher volatility component;
   (c) directly introducing the effluent mixture into a vapor space of lower pressure to flash vaporize at least a portion of the higher volatility component in the liquid mixture;
   (d) removing from the zone of lower pressure a vapor stream comprising said inert gaseous fluid and the vaporized component of higher volatility; and
   (e) recovering and directing the resulting liquid mixture less concentrated in the higher volatility component than the feed mixture to a subsequent evaporation process to deplete further the component of higher volatility.

2. The method of claim 1 wherein the mixing of the inert fluid with the preheated liquid is accomplished in a jet eductor which comprises a nozzle located within and surrounded by an eductor body, the eductor body in fluid communication with a diverging diffuser, the method which includes introducing a pressurized inert gas into the nozzle, introducing the preheated liquid mixture into the eductor body, and discharging the effluent mixture into the diverging diffuser.

3. The method of claim 1 wherein the inert fluid is an inert gas selected from the group consisting of dry saturated steam, super-heated steam, compressed air, nitrogen, hydrocarbon gas, ammonia, carbon dioxide, carbon monoxide, hydrogen, helium, halogens, fluoro-carbons and mixtures thereof.

4. The method of claim 1 wherein the method includes recovering the component of higher volatility from the vaporized effluent stream removed from the zone of lower pressure.

5. The method of claim 1 wherein the liquid less concentrated in the higher volatility component is directed into the top of a gravity feed evaporation system wherein the liquid is contacted by a counter-current stream of an inert gaseous medium, and wherein the said inert stream containing a component of higher volatility from the liquid mixture in the evaporation system is directed into the zone of lower pressure, and removed with the inert gaseous stripping medium and the constituents of higher volatility.

6. The method of claim 5 wherein the gravity feed evaporation system includes a tube-and-disc evaporator device operated under vacuum and from which a liquid product is recovered from the base thereof stripped to a predetermined content of the component of higher volatility.

7. The method of claim 1 wherein the liquid less concentrated in the component of higher volatility is subjected to at least one step of the process of claim 1.

8. The method of claim 1 wherein the relatively higher volatility component is an alcohol and where the relatively lower volatility component is an ester.

References Cited

UNITED STATES PATENTS

| | | | |
|---|---|---|---|
| 2,177,664 | 10/1939 | Lee | 203—88 |
| 2,224,984 | 12/1940 | Potts et al. | 203—88 X |
| 3,298,931 | 1/1967 | Herbert et al. | 203—90 X |
| 3,320,220 | 5/1967 | Drusco et al. | 260—80.5 |

FOREIGN PATENTS 487,236  6/1938  Great Britain.

NORMAN YUDKOFF, *Primary Examiner.*

J. SOFER, *Assistant Examiner.*